H. L. Emery,
Horse Power.

Nº 8,754.     Patented Feb. 24, 1852.

UNITED STATES PATENT OFFICE.

HORACE L. EMERY, OF ALBANY, NEW YORK.

IMPROVEMENT IN ENDLESS-CHAIN HORSE-POWERS.

Specification forming part of Letters Patent No. 8,754, dated February 24, 1852.

*To all whom it may concern:*

Be it known that I, HORACE L. EMERY, of Albany, in the county of Albany and State of New York, have invented a new and Improved Method of Constructing and Combining Gearing with and to Endless-Chain Horse-Powers, whereby I can more readily adapt its use to a greater variety of purposes and with different degrees of velocity and power at my pleasure, as the case may require; and I do declare that the following is a full and correct description of the same, together with the drawings which accompany this specification and form a part of the same.

Figure 1:
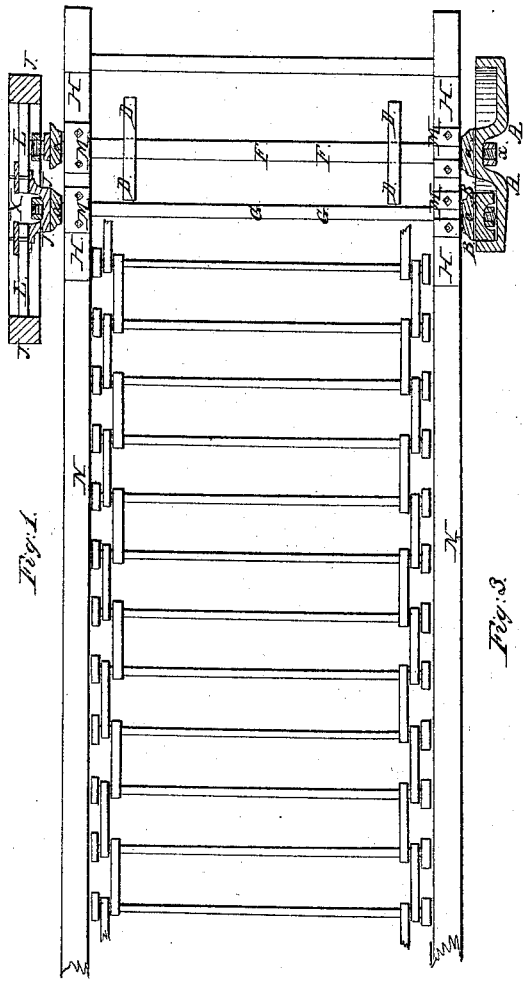

Figure 1 presents a top view or map of the gearing-shaft sills of the frame-work, together with a portion of the endless platform drawn back from over the shafts and with the plank flooring taken out of the chain. N N show the upper sides of the sills. H H H H show the short bearing girts which support the two gear-shafts; F F and G G, the two gear-shafts; M M M M, the caps of the bearings of the shafts. D D D D show the two reels, (which have clutches or forks on them,) these reels being firmly fixed upon the forward shaft F F and serve the double purpose of driving the shaft and forming the circuit of the endless platform by receiving into the clutches the small shafts of the platform and revolving together. J J J J show the band-pulley; L L, the arms or spokes of the same. *a a a a* are the couplings or shoulders upon the shafts outside of the bearings and power itself, to which all the gearing and band-pulleys are attached; *x x x x*, the ends of the shafts extending beyond the couplings or shoulders and by which the gears and pulleys are confined by nuts and screws or their equivalent. B B show a sectional view of the small gear or pinion on the end of the shaft G G. A A show a sectional view of the converge gear and the manner of fastening the same in its position, being the same as with the pinion just described, and in position for working together.

Figure 2:
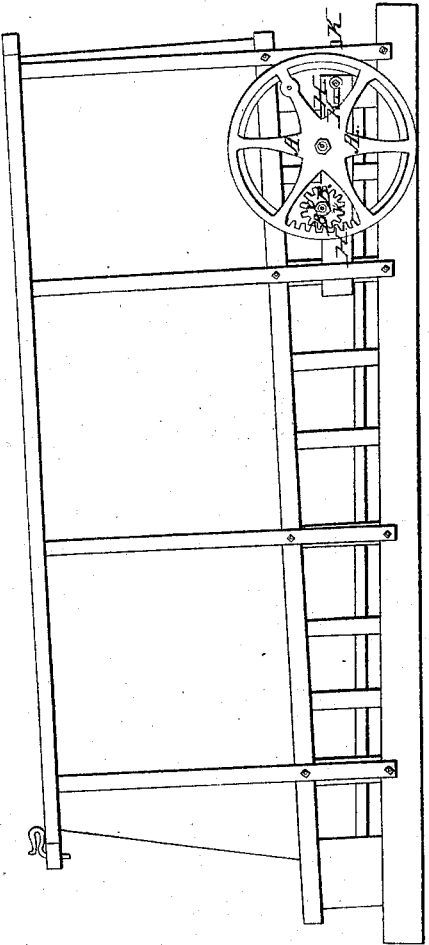

Fig. 2 shows a side view of the horse-power complete, with the improvements. A A is the side or face view of the converge-gear, reaching over the pinion; B B, the pinion worked by the converge-gear. *a* on one of the arms of the converge-gear shows a plate projection for receiving a wrist-pin for connecting-rod for reciprocating motion; H H, the short movable girts which support the bearings of the gear-shafts; K K, the joint-bolts at the forward end. By these, together with the slots in the girts, the said girts and shafts are readily drawn forward for tightening the chain.

Figure 3:
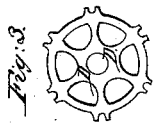

Fig. 3 shows a side view of one of the reels detached, same as shown at D D on the forward gear-shaft F.

Figure 4:
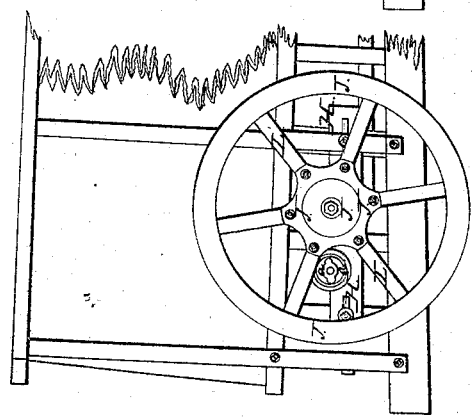

Fig. 4 shows the reverse side of the power from that seen in Fig. 2. In this is seen a band-pulley J J J J when confined on the shaft G and opposite the pinion. The end of the shaft F is here shown with its coupling or shoulder, to which either of the several gears and pulleys can be attached.

From the foregoing it will readily be seen that in moving the endless platform the motion and power is at one and the same time communicated to the reels and the shaft F, thence to the converge wheel-pinion, and by the shaft G to the band-pulley J, the diameter of the reels being such that the walk of horses, mules, or oxen at two miles per hour will give them fifty-five revolutions per minute, and the relative diameters of the converge and internal gear being as four to one, it necessarily follows the pinion-shaft and band-pulley must receive two hundred and twenty revolutions per minute. This is found sufficient with a pulley about three feet diameter to propel circular saws, threshing-machines, turning-lathes, &c., with sufficient velocity.

By the peculiar construction of the gears and pulleys, as also the ends of the shafts themselves, each of the said pulleys and gears may be readily transposed to either of the other places. For instance, the band-pulley may be removed from its present position in Fig. 4 and placed upon the end of the shaft shown in same figure, and it will receive but the fifty-five revolutions per minute. Both ends of the shaft having the same coupling or fastening, the pulley can be attached on either side. Again, if the pulley remain fixed, as shown in Fig. 4, while the converge gear and pinion shown in Fig. 2 be transposed, the pinion B B, where the converge-wheel is, and the converge-wheel where the pinion B B now is, the motion of the shaft F being the same as before, the motion of the shaft G will be reduced to but about fourteen revolutions per minute, &c. Where different degrees still of motion are wanted it is readily obtained in the same manner by using gearing of different relative diameters.

For the purposes of threshing grain, sawing wood, propelling cotton-gins, cider-mills, and most mechanical purposes with horse-power and communicating the same directly by the belt from the power itself, it is necessary that the direct motion of the shafts in all the changes of velocity should be the same, so as to avoid the crossing of bands and causing an unnecessary wear, as also friction of the band itself, as necessarily is the case wherever the diameters of the two belt-pulleys are greatly different, as this difference forces the crossing near to the small pulley and causes the band to run with a twist in it and upon itself. Therefore it becomes necessary in order to change the converge-gearing from side to side of the power, as also to transpose it from one shaft to the other, to have the gearing and pulleys constructed expressly for the purpose, so as to allow of the changes with as little trouble as possible, as also not to disturb the shafts themselves.

In the plan herein submitted the several gears and pulleys are all constructed with a uniform shoulder or coupling upon their inner sides at the center, where they fit the shafts. Their outer sides at their centers are made concave sufficiently to receive all the same kind of fastenings, and at the same time these fastenings are all within the plane of the inner sides of the spokes and arms of the gears and pulleys which overreach the shaft next to that upon which such overreaching pulley or gear may be attached. Without this concaved outer side bringing the fastenings, (whether nuts and screws,) as shown in the specification and drawings, or their equivalent, as also the constructing the shafts and fastenings so that the faces of the couplings or shoulders, as also the ends of the shafts themselves in the planes of each other, the gearing and pulleys could not be transposed.

The purpose, therefore, of my invention and improvement is to enable the owner of one of these improved geared horse-powers to adapt its use to different degrees of velocity and power required to perform his various mechanical or agricultural operations, by furnishing with each and every set of machines a complete set of shafting and gearing and pulleys, without additional cost over the old kinds of horse-powers, to be applied directly to each and every operation, and always in the same or direct direction required, to avoid the crossing of belts and otherwise unnecessary friction. With the changes of the gearing and pulleys, when so constructed, he has at one and the same time with two horses a sufficient velocity and power to work a thrashing-machine, circular saw, &c., to his satisfaction, while he can in an instant change the velocity to one-fourth that just described, and with the same proportionate increase of force, or that of eight horses, and used in driving mills for grinding feed, cutting fodder, pumping, churning, &c., while by another change, as readily made, the velocity is again decreased four times and force increased in same proportion, or the force of thirty-two horses, or sixteen times the first with the thrashing-machine. This is being used for propelling ferry-boats, lake-boats, pile-drivers, elevators in warehouses, discharging vessels, and various other purposes where greater or less force and motion are required.

Having thus fully explained my improvement and its purposes, what I claim as new, and desire to secure by Letters Patent of the United States, is—

The manner of constructing the converge gears, pinions, and pulleys of the endless-chain horse-power, with their outer sides concave at their centers sufficiently to receive their fastenings within the plane of the inner side of the arms, spokes, or faces of such of the gears and pulleys which, when confined upon one shaft and overreach the other shaft, may pass both shaft and fastening freely, the faces of the several couplings or shoulders upon the shafts, as also the ends of the shafts themselves, being in the same planes, and all the fittings and fastenings of shafts, gears, and pulleys agreeing with each other, for the purpose and in the manner substantially as described.

HORACE L. EMERY.

Witnesses:
J. J. GREENOUGH,
A. B. STOUGHTON.